April 2, 1940. H. S. TURNER 2,195,802
TEMPERATURE CONTROL SYSTEM
Original Filed July 1, 1935  2 Sheets-Sheet 1

INVENTOR.
Hubert S. Turner

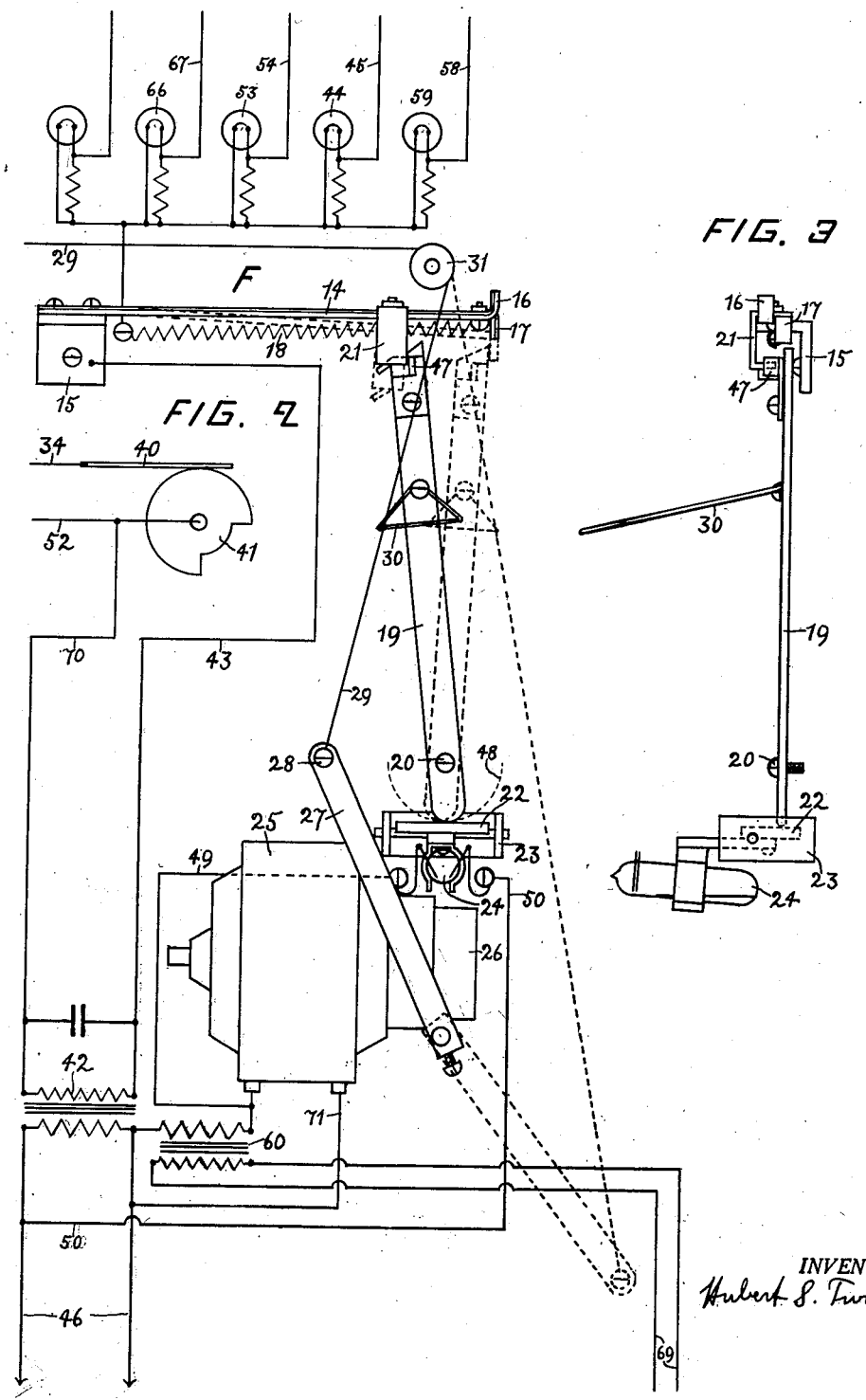

Patented Apr. 2, 1940

2,195,802

UNITED STATES PATENT OFFICE 2,195,802

TEMPERATURE CONTROL SYSTEM

Hubert S. Turner, Brooklyn, N. Y.

Application July 1, 1935, Serial No. 29,270
Renewed August 31, 1939

13 Claims. (Cl. 236—68)

This invention comprises a supersensitive thermostatic means, whereby a given temperature of any enclosed area can be maintained within a small fraction of a degree of the temperature desired. It also comprises means, whereby a thermostatic device adjusted to close a circuit at a predetermined temperature point, will reverse the action taken as soon as the temperature of the enclosed area reverses its rise or fall, without waiting for the mentioned predetermined temperature point to be again reached. The thermostat used can be such that a rise or fall of temperature between set points will close an electrical circuit, while if the rise or fall continues beyond one of the set points, the circuit will be opened. The thermostat used can also provide for a lower or higher night temperature, without any mechanical adjustment being made of the thermostatic member by manual or automatic means. Preferably used with this thermostatic means is a time-lag control device for developing the mechanical movement necessary to open and close the draft doors of boilers, valves of air conditioning equipment, throttles of steam engines controlling refrigeration compressors, and the like. This control device, operated by the thermostats, is unique in being completely non-magnetic in character and operable only by an electrical current which is continuous for a predetermined time interval, thereby overcoming the difficulty experienced with other control devices when a close operating temperature differential is desired. Heretofore, whenever a thermostat was adjusted to a very close differential, a sudden change in temperature, lasting but a few seconds (such as caused by the opening and closing of a refrigeration chamber door on a very hot day), or vibrations and jars to the thermostat itself (such as experienced particularly on moving trains or engine propelled vessels), would cause entirely unnecessary operation of the instrumentality controlled by the device. One of the essential features of the system used in this invention is the means used to prevent such unnecessary operation by intermittent circuit closings at the thermostats.

One of the essential features of this system is the utilization of the different coefficients of distortion offered by a combination of two or more bimetallic strips, each strip of a different thickness, width or length, or a combination of these dimensions. Another essential feature is the utilization of the sluggish action of a heating coil and the sluggish distortion of a bimetallic strip to operate the control device which governs the mechanical movement produced.

In the drawings which illustrate the preferred embodiment of my invention:

Figure 2 is a view of the time lag control device, and

Figure 3 is a view from the right, of the switch actuating device therein.

Figure 1:
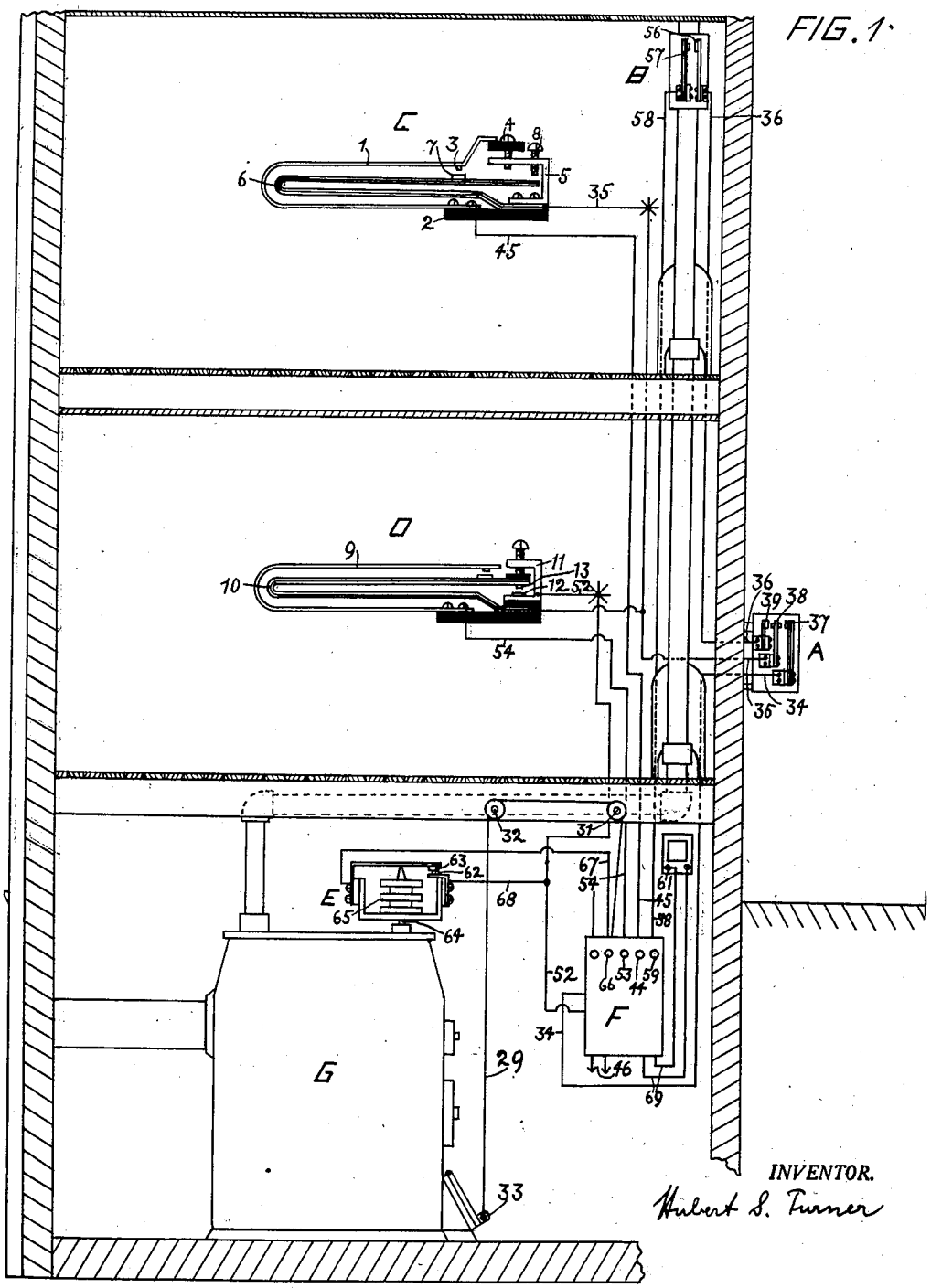
Figure 1 is a cross-sectional view of a part of a building, showing an installation of the control system as applied to a steam heating plant.

Referring to Figure 1 of the drawings, A, B, C and D represent different types of thermostats adaptable for use with the system, which can readily comprise a greater plurality than that shown. Novelty or invention is not specifically claimed for types A and B, but is claimed for types C and D. E represents a pressure control, operating in conjunction with the system, which may or may not be used, for which no claim to novelty or invention is made. C is a side view of a thermostat, comprising a strip of bimetal 1 attached rigidly at one end to an insulating block 2. This strip is, preferably, doubled back on itself, as shown. The free end of this strip bears an electrical contact point 3 and the downward movement of this end of the strip is limited by the insulating nut on adjusting screw 4, which is threaded into bracket 5. 6 is another bimetallic strip, similar to 1, but thicker or wider, or both thicker and wider, also attached rigidly at one end to insulating block 2, but not in electrical contact at that end with strip 1. Near its free end it bears an electrical contact point 7 adapted to engage point 3. The upward movement of the free end of strip 6 is limited by adjusting screw 8, threaded into bracket 5. Due to the difference in characteristics mentioned between strips 1 and 6, strip 1 will distort at its free end, for any given temperature change, quicker and further than strip 6. Both strips are so mounted that a fall in the temperature of the air surrounding them will distort their free ends downward, when a heat control is desired and reversely mounted when a cooling control is used. D represents a similar type of thermostat, the two strips 9 and 10 corresponding to 1 and 6 respectively. There is no adjusting screw such as 4 to limit the downward movement of strip 9, and bracket 11 bears an electrical contact point 12 on its lower arm, which is adapted to engage contact point 13 on strip 10. Bracket 11 is insulated from strip 10 by the insulation under the lower arm of the bracket and an insulating piece on the upper side of the free end of strip 10.

In Figure 2 F represents the time-lag control device mentioned. It comprises, essentially, a strip of bimetal 14, mounted rigidly at one end to bracket 15 and with the other end split in the center and one piece 16 turned up and one piece 17 turned down, forming two lugs or stops. Mounted underneath strip 14 is a spiral coil 18 of high resistance wire, such as is commonly used in electrical heating devices. One end of coil 18 is connected, for convenience, to strip 14 near its free end. Lever 19 swings freely from side to side, being held in position loosely by fulcrum 20. The gravitational fall to the left or right of lever 19 is adapted to be limited normally in its side movements by either stop 21 or stop 17. Stop 21 is formed with a lug on the bottom projecting backwards and which is adapted to engage lug 47, so that when stop 21 is lowered, lug 47 passes over this projecting lug and lever 19 falls freely to the left. Beneath fulcrum 20 is a swinging piece 22, hinged loosely, near one end, to bracket 23 and limited in its rise and fall by the end of lever 19 which rests upon it; as shown more clearly in the side view in Figure 3. Mounted below piece 22 is a two pole mercury switch tube 24, which can be of any standard pattern; the mounting being such that when piece 22 is tilted downward, the mercury switch tube closes the circuit controlled by it. Below tube 24 is mounted electric motor 25 which, by means of a gear reduction shown housed at 26, controls the slow movement of arm 27 in a counterclockwise direction in the same plane as the movement of lever 19. Arm 27 is centered immediately below fulcrum 20. Attached to arm 27 by means of stud 28, is wire, cord or chain 29, which passes upward through loop 30 attached to lever 19 and thence over pulley 31, mounted directly over fulcrum 20, and thence over pulley 32 to the draft damper 33 of a boiler G, as shown, or to any other instrumentality to be operated thereby.

Thermostats A and B may or may not be used with the system. A is adapted to be mounted on the exterior of the temperature controlled room or compartment. Its purpose is to open the controlling circuit of time-lag device F, whenever the exterior temperature has risen or fallen to a predetermined point. When not used wire 34 is connected directly to wire 35 and if thermostat B is used, wire 36 is also connected directly to wire 35. Thermostat B is adapted to be mounted on the conveyor conducting the heating or cooling medium used and within the controlled area; its purpose is to maintain the temperature of the conveyor between predetermined points. Pressure control E is so arranged that an expansion of its metallic bellows by increased pressure, disengages electrical contact points 62 and 63 controlled by it.

Having detailed the parts of the invention, its operation will now be described. While the system is equally adapted to air conditioning or refrigeration, it will be assumed that the system is installed in a building for the purpose of maintaining a heating temperature of seventy degrees Fahrenheit. Then thermostat A on the exterior of the building, is so adjusted that contacts 37 and 38 engage at sixty or sixty five degrees and open when the temperature rises above that point; while contacts 38 and 39 would close only when the exterior temperature fell to say thirty-two degrees. Thermostat B, on the conveyor at a point farthest away from the heating source, but within the building, would be so adjusted that its contacts 56 and 57 would engage when the temperature of the heat conveyor fell to say one hundred degrees. All of the thermostats C, mounted within the building, would be so adjusted that the free end of strip 6 would be but lightly in contact with adjusting screw 8 and point 3 of strip 1 would barely disengage contact 7 at a temperature of seventy degrees. Thermostat D, which is of a type used only if a special night temperature is desired, or when but one thermostat is used, is similarly adjusted. In each multiple thermostat installation, one type D would preferably be mounted in the superintendent's quarters.

If the outside temperature is less than the set point of thermostat A and the temperature of the air surrounding one of the thermostats C falls a fraction of a degree, the sensitivity of strip 1 is such that contacts 3 and 7 immediately engage and a circuit is completed over the following path: strip 6—wire 35—contacts 38 and 37—wire 34—spring 40—base of time clock 41—wire 70—secondary of transformer 42—wire 43—bracket 15—strip 14—coil 18—signal light 44 and resistance in shunt therewith—wire 45 and strip 1, completing the circuit. The primary of transformer 42 is connected to a source of alternating current by way of leads 46; therefore, the low voltage current generated in its secondary illuminates signal light 44 and also heats coil 18. Bimetal strip 14 is mounted so as to distort its free end downward when its temperature is raised by the current passing through coil 18. However, coil 18 heats with a time lag and strip 14 distorts with another time lag, the length of these lags depending on the resistance of the coil 18 and the thickness, width and length characteristics of strip 14; hence the time lag can be adjusted to suit any operating condition. The distortion downward of strip 14 finally causes the lug on the bottom of stop 21 to release stop 47 on the upper end of lever 19 and lever 19 falls to the left, due to it being off the perpendicular, or because wire 29 presses against the side of spring wire loop 30, according to the adjustment made. The disengagement of stops 21 and 47 is shown clearly in Figure 2, as the latter is a side view. The lower end of lever 19 describes the arc as shown by dotted line 48, and as the pressure is released on the short end of piece 22, the long end tilts downward and a circuit is closed over the following path: left contact of mercury switch 24—wire 49—motor 25—wire 71—alternating current source through leads 46—wire 50—right contact of mercury switch 24, completing the circuit. The current flowing in this circuit causes arm 27 to slowly revolve to the left, pulling wire 29 downward as it does so. When arm 27 has revolved to the position shown by dotted lines and wire 29 is in the position shown by a dotted line, lever 19 is moved to the position also shown by dotted lines, due to wire 29 passing through loop 30 on lever 19.

This movement causes piece 22 to be raised again and the mercury to flow away from the contacts in tube 24 and consequently motor 25 stops. Lever 19 is prevented from falling further to the right, as its free end now engages stop 17, which has been lowered due to the distortion downward of strip 14, as shown by the dotted lines.

As soon as the temperature begins to rise in the controlled area, contact 3 of thermostat C will disengage contact 7, irrespective of whether the temperature is actually the set seventy degress or lower. This is due to the fact that as strip 1 is of less mass than strip 6 it distorts quicker in an upward direction than strip 6. Consequently, the circuit is opened through heat coil 18 and strip 14 immediately starts to cool off and return to its normal position; doing so with a time lag due to the slow dissipation of heat from coil 18 and the slow radiation of heat from strip 14. As soon as stop 17, in rising, has cleared the free end of lever 19, the latter falls to the right, tilting piece 22 again and starting the motor. The movement of arm 27, on account of wire 29 passing through loop 30, restores lever 19 to its normal position against stop 21; opening the circuit through the motor, and restoring arm 27 and the device operated by wire 29 to their normal positions, thereby shutting off the increased supply of heat to the building.

Heretofore, whenever thermostatic bimetallic strips, bearing electrical contacts have been used, it has been found that when the contacts are very close together, as they must be when a close operating differential is desired; mechanical vibrations or short gusts of air of lower temperature would cause the contacts to momentarily close, thereby operating intermittently and unnecessarily the device controlled by the thermostat. This has lead to the use of thermostats that require a distortion range from one contact to another to operate the device and consequently prevents a close differential from being used.

One of the purposes of the time-lag device of the present invention is to overcome this intermittent operation of the controlled device and at the same time allow a closer operating differential for the thermostats than has ever been attempted before. As contacts 3 and 7 of thermostat C may be adjusted so close together that a fraction of a degree drop in temperature will cause their engagement, "chattering" or intermittent closing and opening of the circuit controlled by the thermostat does occur; however, as the heating, first of coil 18 and then strip 14, requires a certain time interval, such momentary closing of the control circuit does not operate the device, signal light 44 merely "winking" on and off. The time interval for a continuous closed circuit necessary to operate the device is under complete control by adjustments of coil 18 and strip 14 and can be from a few seconds to several minutes, as desired.

As there is no magnetic instrumentality of any kind used in the control device, sparking at the contacts of the thermostats is greatly reduced from what it is when a magnet or other inductance producing means is used. To still further reduce the sparking, the contacts of the thermostats can be bridged by condensers, though I find that one condenser connected across the secondary terminals of transformer 42, as shown, is all that is needed, or a very high resistance can be substituted therefor.

Another defect in all classes of thermostats heretofore used in the production of what is called "overriding," which means that when heat is sent to a controlled area and is only cut off when the temperature actually reaches seventy degrees, or the predetermined circuit closing point, as there is a considerable lag before the heat is reduced in the conveyors or radiators, the actual temperature of the controlled area may rise to seventy four degrees or even higher and then only, slowly fall to the set seventy degrees. Complicated and expensive mechanisms have been devised in attempts to overcome this overriding, but the simple means used in thermostats C and D does it very well.

The prevention of this "overriding" will now be explained. Assuming that the temperature of the controlled area had fallen to sixty-eight degrees before the increased heat released by the control device had reached it; then both strips 1 and 6 of thermostat C would have distorted downward, though always in contact, to the position corresponding to that temperature. As soon as the temperature began to rise strip 1, which distorts faster than strip 6, would have distorted upward opening contacts 3 and 7. At the same time strip 6 would have similarly distorted upward, but as its mass is greater than that of strip 1 the distortion is slower, thereby allowing the contacts to disengage. Now, should the heat impulse thus released in the controlled area be insufficient to bring the temperature up to seventy degrees, strip 1 will cease its distortion upward quickly, but strip 6 will continue to distort upward until its contact 7 reengages contact 3 of strip 1. This will cause more heat to be released in the controlled area and the described action will be repeated. This action may occur several times, under unusual conditions, until finally the free end of strip 6 engages screw 8, preventing its further distortion upward and contacts 3 and 7 separate definitely, as soon as the temperature is exactly seventy degrees, until the temperature again starts to fall. The impulses of heat delivered in this way do not allow "overriding" as they are comparatively of short duration and the last "cut-out" will occur before seventy degrees has been reached, due to strip 1 continuing its upward distortion when strip 6 is checked by screw 8. I have found that when an adequate source of heat is provided, a sensitive thermometer in the controlled area will never show a readable fluctuation. It must be remembered that when the thermostat contacts disengage, time-lag device F does not cut off the increased heat immediately and this gives the heat impulses the correct duration for any given condition, the normal adjustment of the time-lag being that required.

Any "chattering" or intermittent opening of the controlling circuit at the thermostat, as the strips are distorting upward or afer the control device F has operated, will not re-operate the device and bring it back to its normal condition. This is due to the retained heat in coil 18 and strip 14, which prevents the release of lever 19 to the right until a definite time interval has elapsed without current passing through the coil.

Another defect in all classes of thermostats heretofore used is the production of what is called "cold seventy," meaning the formation of stratas of air of different temperatures in the controlled area; the strata at the level of the thermostat only, being seventy degrees, while those lower down are considerably less. This effect is due to the length of time between heat impulses, which in turn is due to the operating differential compulsory in all other thermostats. Such stratas are directly caused by a lack of circulation of air in the controlled area, due to the lack of frequent heating of the radiating system. The short but more frequent heat impulses produced by the described system overcomes this trouble completely, as well as representing a notable economy in the consumption of fuel.

Heretofore, a disadvantage in the use of a plurality of thermostats in an apartment house or an office building has been that a tenant, on a cold day, would cut off his radiators or leave windows wide open, thereby causing the heat device to remain in operation and heat sent up, in a vain effort to bring the abnormally chilled area up to the set point and only succeeding in overheating the remainder of the building. Type C thermostat overcomes this difficulty in the following simple manner: The downward distortion of the free end of strip 1 is limited by the insulating nut of screw 4, which can be so adjusted that strip 1 is stopped at a temperature of say sixty-five degrees. Therefore, when the controlled area temperature is lowered to sixty-five degrees, the downward distortion of strip 6 separates it from strip 1.

In the case just mentioned, the overheating of the balance of the building is prevented by the removal of thermostat C of the abnormally chilled area from any control over time-lag device F and the normal heating of the building continues under the control of all the other thermostats C installed therein. When the windows are closed or radiators opened in the affected area, the heat received, governed by these other thermostats, will raise the temperature to sixty-five degrees and restore to control the thermostat C of the affected area. To prevent the operation of the time lag device while the temperature of the abnormally chilled area is between 65 and 70 degrees, the device can be adjusted so that it will require the heating effect of two or more thermostats C to operate it.

Type D thermostat is used when a special night temperature, lower than the day temperature, is desired or when the automatic cut-out feature is not wanted. It operates similarly in every way to type C, except that it has no limiting screw 4 and comprises an extra contact 12 adapted to be engaged with contact 13 at a temperature of say sixty degrees. When this engagement occurs an electrical circuit is established over the following path: contacts 13 and 12—bracket 11—wires 52 and 70—secondary of transformer 42—wire 43—bracket 15—strip 14—coil 18—signal lamp 53 and resistance in shunt therewith—wire 54—strips 9 and 10, completing the circuit. The consequent operation of device F allows sufficient heat to be distributed to disengage contacts 12 and 13.

In all installations of type C thermostats, one type D should be installed in the superintendent's apartment or office, or in any area accessible to the one in charge of the heating. This is done so as to assure the holding or raising of the temperature in the morning to the set point of sixty-five degrees of the type C thermostats, thereby allowing the latter to cut into control.

Time clock 41, controlling the circuit through spring 40 is a device well known in the art and is not claimed herein. It can be eliminated from the system without changing its normal operation, wire 34 being connected directly to wire 70 and thence to the secondary of transformer 42 or thereto by way of a hand switch.

Thermostat B exercises control, maintaining a minimum heat in the distribution system, only when the outside temperature falls to say thirty-two degrees or less. Its use is another precaution against stratification of air in the controlled area and its use serves a psychological need in a many tenanted building, in assuring that the conveyors and radiators will always be at a minimum temperature in really cold weather. The engagement of contacts 56 and 57 establishes a circuit over the following path: contact 57—wire 58—signal light 59 and shunted resistance—coil 18—strip 14—bracket 15—wire 43—secondary of transformer 42—clock 41—spring 40—wire 34—contacts 37, 38, 39, wire 36 and contact 56, completing the circuit and operating device F. When the heat in the conveyor to which thermostat B is attached is sufficient to open contacts 56 and 57, device F returns to normal and the heat is cut-off.

The primary of transformer 60 is multipled on the leads of motor 25 and a buzzer 61 is connected to the secondary by way of wires 69. Consequently, whenever motor 25 operates, an audible signal will be given. This alarm is used only when an installation is made controlling a boiler or refrigeration machine demanding human attention in order to meet the increased demand caused by the operation of device F.

The only purpose of the shunts around signal lamps 44, 53, 59 and 66 is to increase the life of the bulbs by reducing the current passing therethrough and also so as to prevent an interruption to the operation of the system, should a bulb burn out.

Signal lamps 44, 53, 59 and 66 are preferably mounted close to strip 14, so that the heat furnished by their filaments and shunts assist in the distortion of strip 14. However, these lamps can be mounted in a building manager's office if desired.

To reverse the mechanical controlling action of wire 29 of device F, it is only necessary to reverse strip 14 and change stop 21 to correspond, lug 16 then functioning for lug 17.

The voltage produced by secondary of transformer 42 should be as low as possible, the governing factor being the distance the thermostats are located from device F. I have found that six to twelve volts cover the ordinary ranges.

If direct current is used, resistances can be substituted for transformer 42, in order to keep the voltage as low as possible.

Time lag device F can be used with and operated by any of the standard forms of pressure controls or any other circuit closing device, by merely connecting the two circuit closing contacts of such devices in the same way as strips 1 and 6 of thermostat C. When so used the pressure control or other device can be made of a very sensitive and simple type, taking advantage of the fact that device F cannot be operated by intermittent contacts. Such a pressure device, in its simplest form is shown in E. No means for obtaining an operating differential is required, as contacts 62 and 63 must remain engaged for the time needed to operatively heat strip 14; consequently, fluctuations of pressure slightly above and below the predetermined point can be disregarded. In the form shown pipe 64 connected to expansible bellows 65, is also connected to the source of pressure. The expansion of bellows 65 disengages contact 63 from contact 62. The normal operating circuit is over the following path: contact 62—wire 68—wire 52—secondary of transformer 42—wire 43—bracket 15—strip 14—coil 18—signal lamp 66 and resistance shunt—wire 67 and contact 63. Many commercial processes which require a mechanical movement to be performed only after another movement has taken place for a predetermined time interval, can take advantage of the use of time lag device F and such use has been considered for this invention.

Strip 9 of thermostat D is shown in the position it would be when the temperature was considerably above the set point, showing how the upward distortion of strip 10 is impeded under such conditions.

The two bimetallic strips of thermostat C are shown in the position they would occupy when the controlled area was abnormally chilled, as described, illustrating how the controlling circuit is opened in that event.

The special thermostats C and D, herein disclosed, form the subject matter of my copending application Serial No. 86,998, filed June 24, 1936.

Having thus described the invention and its operation, what I claim as new is:

1. Means for controlling a mechanical movement, comprising a bimetallic strip, a heating coil for distorting said strip and a circuit closing means included in an electrical circuit with said coil and a source of electrical energy; a switch actuating lever whose movement is controlled by stops on said strip; a switch operated by said lever when not controlled by one of said stops; an electrical motor controlled by said switch with an arm on its shaft revolving in the same plane as the movement of said switch lever; a mechanical connection between said arm and a device mechanically operated thereby, said mechanical connection also controlling the movement of said switch lever; the distortion of said strip releasing said lever from control of one of said stops; and means to move said lever into contact with another of said stops.

2. Means for controlling a mechanical movement, comprising a thermostatic element, a heating coil for distorting said element and a circuit closing means included in an electrical circuit with said coil and a source of electrical energy; said heating coil mounted in juxtaposition to said element; a switch lever whose movement is controlled by two stops on said element; a switch operated by said lever when not controlled by one of said stops, an electrical motor controlled by said switch, an arm on the shaft of said motor revolving in the same plane as the movement of said switch lever; a mechanical connection between said arm and a device mechanically operated thereby, said mechanical connection also governing the movement of said switch lever; the closing of said circuit, for a predetermined time only, raising the temperature of said heating coil and said element, the consequent distortion of said element releasing one of said stops from mechanical engagement with said switch lever, the consequent movement of said switch lever in one direction closing said switch, starting said motor, operating said device and moving said switch lever to a position in mechanical engagement with the other of said stops; thereby stopping said motor when said arm has reached a predetermined position; and means, comprising the subsequent opening of said circuit for a predetermined time, to lower the temperature of said coil and said element, the consequent return to its original position of said element releasing said second mentioned stop from mechanical engagement with said lever and the consequent movement of said lever, in a direction opposite to said first mentioned movement, closing said switch again, starting said motor again, restoring said mechanical device to normal and restoring said switch lever to its normal position against said first mentioned stop and stopping said motor with said arm returned to its normal position.

3. A thermal relay; comprising a thermostatic element and a heating element in juxtaposition thereto, both included in an electrical circuit including a source of electrical energy; a switch lever whose movement is controlled by two stops on said thermostatic element, an electrical switch operated by said lever when not controlled by either of said stops, an electrical motor controlled by said switch, an arm on the shaft of said motor revolving in the same plane as the movement of said switch lever, a mechanical connection between said arm and a device mechanically operated thereby and a mechanical connection between said arm and said switch lever to control the movement of said lever.

4. A device of the character described comprising a member distortable by heat, electrical heating means associated therewith, a pair of spaced stops carried by said member, a pivoted lever selectively engageable with said stops dependent upon the position of said distortable member to limit movement of said lever and releasable for further movement by actuation of said distortable member, a self-closing switch held open by said lever when in engagement with either stop, a rotatable element, a motor controlled by said switch for rotating said element, means associated with said element for swinging said lever, and mechanism controlled by said rotatable element.

5. A device of the character described comprising a member distortable by heat, electrical heating means associated therewith, a pivoted lever, means carried by said member for engagement by said lever dependent upon the position of said member to retain said lever in either of two settings, said lever being releasable for further movement by actuation of said distortable member, a self-closing switch held open by said lever when in either of said settings, a rotatable element, a motor controlled by said switch for rotating said element, means associated with said element for swinging said lever, and mechanism controlled by said rotatable element.

6. A device of the character described comprising a member distortable by heat, electrical heating means associated therewith, a self-closing switch held open by means including said distortable member in either of two positions thereof and releasable upon movement of said member from either such position, electrically-operated means controlled by said switch, means associated with said last-named means for restoring said switch to open position after release to closed position by movement of said distortable member, and mechanism controlled by said rotatable element.

7. A device of the character described comprising a member distortable by heat, electrical heating means associated therewith, a self-closing switch held open by means including said distortable member and a pivoted lever limited in movement in either direction by said distortable member depending upon the position of said member and releasable for further movement upon change of said distortable member from such position, electrically-operated means controlled by said switch, means associated with said last-named means for restoring said switch to open position after release to closed position by movement of said distortable member, and mechanism controlled by said rotatable element.

8. A device of the character described comprising a member distortable by heat, electrical heating means associated therewith, a self-closing switch, means controlled by said distortable means for holding said switch in open position and releasing said switch to closed position dependent upon the position of said distortable member, electrically-operated means controlled by said switch, means associated with said last-named means for restoring said switch to open position after release to closed position by movement of said distortable member, and mechanism controlled by said rotatable element.

9. A device of the character described comprising a member distortable by heat, electrical heating means associated therewith, a thermostat controlling the flow of electrical energy to said means, a pivoted lever, a pair of spaced stops carried by said member, a pivoted lever selectively engageable with said stops dependent upon the position of said distortable member to limit movement of said lever and releasable for further movement by actuation of said distortable member, a self-closing switch held open by said lever when in engagement with either stop, a rotatable element, a motor controlled by said switch for rotating said element, means associated with said element for swinging said lever and a source of heat controlled by said rotatable element.

10. A device of the character described comprising a member distortable by heat, electrical heating means associated therewith, a thermostat controlling the flow of electrical energy to said means, a pivoted lever, means carried by said member for engagement by said lever dependent upon the position of said member to retain said lever in either of two settings, said lever being releasable for further movement by actuation of said distortable member, a self-closing switch held open by said lever when in either of said settings, a rotatable element, a motor controlled by said switch for rotating said element, means associated with said element for swinging said lever and a source of heat controlled by said rotatable element.

11. A device of the character described comprising a member distortable by heat, electrical heating means associated therewith, a thermostat controlling the supply of electrical energy to said means, a self-closing switch held open by means including said distortable member in either of two positions thereof and releasable upon movement of said member from either such position, electrically-operated means controlled by said switch, means associated with said last-named means for restoring said switch to open position after release to closed position by movement of said distortable member and a source of heat controlled by said electrically-operated means.

12. A device of the character described comprising a member distortable by heat, electrical heating means associated therewith, a thermostat controlling the supply of electrical energy to said means, a self-closing switch held open by means including said distortable member and a pivoted lever limited in movement in either direction by said distortable member depending upon the position of said member and releasable for further movement upon change of said distortable member from such position, electrically-operated means controlled by said switch, means associated with said last-named means for restoring said switch to open position after release to closed position by movement of said distortable member and a source of heat controlled by said electrically-operated means.

13. A device of the character described comprising a member distortable by heat, electrical heating means associated therewith, a thermostat controlling the supply of electrical energy to said means, a self-closing switch, means controlled by said distortable means for holding said switch in open position and releasing said switch to closed position dependent upon the position of said distortable member, electrically-operated means controlled by said switch, means associated with said last-named means for restoring said switch to open position after release to closed position by movement of said distortable member and a source of heat controlled by said electrically-operated means.

HUBERT S. TURNER.